US011001037B2

(12) United States Patent
Hagen et al.

(10) Patent No.: US 11,001,037 B2
(45) Date of Patent: May 11, 2021

(54) COMPOSITE PANE HAVING SUN PROTECTION COATING AND THERMAL-RADIATION-REFLECTING COATING

(71) Applicant: SAINT-GOBAIN GLASS FRANCE, Courbevoie (FR)

(72) Inventors: Jan Hagen, Bonn (DE); Robert Besler, Herzogenrath (DE); Valentin Schulz, Niederzier (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 16/769,454

(22) PCT Filed: Oct. 15, 2018

(86) PCT No.: PCT/EP2018/078077
§ 371 (c)(1),
(2) Date: Jun. 3, 2020

(87) PCT Pub. No.: WO2019/110172
PCT Pub. Date: Jun. 13, 2019

(65) Prior Publication Data
US 2020/0384739 A1  Dec. 10, 2020

(30) Foreign Application Priority Data
Dec. 5, 2017 (EP) .................... 17205439

(51) Int. Cl.
*B32B 7/02* (2019.01)
*B32B 17/10* (2006.01)
*C03C 17/36* (2006.01)

(52) U.S. Cl.
CPC .... *B32B 17/10201* (2013.01); *B32B 17/1022* (2013.01); *B32B 17/10036* (2013.01);
(Continued)

(58) Field of Classification Search
CPC ........ B32B 17/10036; B32B 17/10174; B32B 17/10201; B32B 17/1022;
(Continued)

(56) References Cited

U.S. PATENT DOCUMENTS

2006/0182980 A1  8/2006 Barton et al.
2009/0046355 A1  2/2009 Derda et al.
(Continued)

FOREIGN PATENT DOCUMENTS

DE  199 27 683 C1  1/2001
EP  2 167 436 A1  3/2010
(Continued)

OTHER PUBLICATIONS

International Search Report as issued in International Patent Application No. PCT/EP2018/078077, dated Jan. 18, 2019.

*Primary Examiner* — Lawrence D Ferguson
(74) *Attorney, Agent, or Firm* — Pillsbury Winthrop Shaw Pittman LLP

(57) ABSTRACT

A composite pane, includes an outer pane having an outer-side surface and an interior-side surface, an inner pane having an outer-side surface and an interior-side surface, and a thermoplastic intermediate layer, which joins the interior-side surface of the outer pane to the outer-side surface of the inner pane. The composite pane has, between the outer and inner panes, a sun protection coating, which substantially reflects or absorbs rays outside the visible spectrum of solar radiation. The composite pane has, on the interior-side surface of the inner pane, a thermal-radiation-reflecting coating (low-E coating). The composite pane has a transmittance index A of 0.02 to 0.08, wherein the transmittance index A is determined according to the following formula $A = TL_{composite\ glass\ pane}/(TL_{low\text{-}E\text{-}coated\ pane} * TE)$. TL is the
(Continued)

Figure 1:
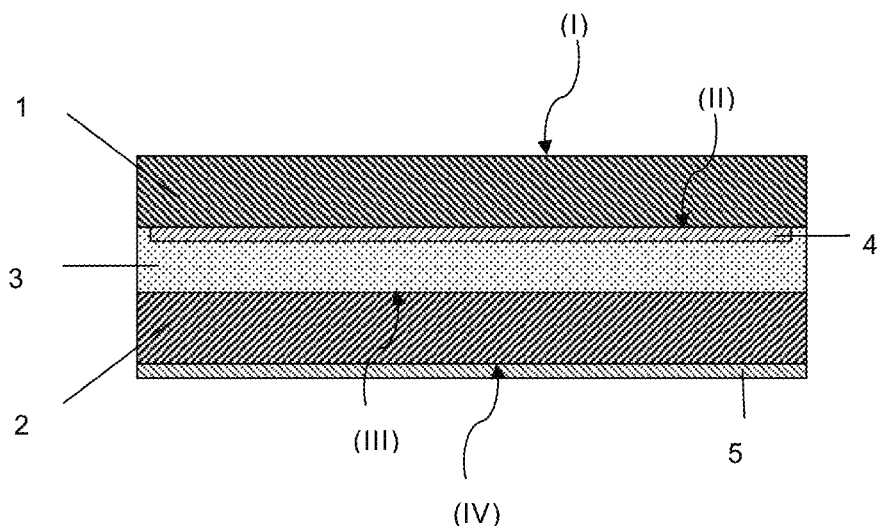

light transmittance and TE is the energy transmittance measured according to ISO 9050.

20 Claims, 1 Drawing Sheet

(52) U.S. Cl.
CPC .. *B32B 17/10229* (2013.01); *B32B 17/10449* (2013.01); *B32B 17/10495* (2013.01); *B32B 17/10761* (2013.01); *C03C 17/366* (2013.01); *C03C 17/3639* (2013.01); *C03C 17/3644* (2013.01); *B32B 2255/20* (2013.01); *B32B 2307/412* (2013.01); *B32B 2605/006* (2013.01); *C03C 2217/70* (2013.01); *C03C 2217/948* (2013.01)

(58) Field of Classification Search
CPC ........ B32B 17/10229; B32B 17/10431; B32B 17/10449; B32B 17/10495; B32B 17/10761; B32B 2255/20; B32B 2307/412; B32B 2605/006; C03C 17/00; C03C 17/3639; C03C 17/3644; C03C 17/366; C03C 2217/70; C03C 2217/948

See application file for complete search history.

(56) References Cited

U.S. PATENT DOCUMENTS

| | | |
|---|---|---|
| 2010/0165436 A1 | 7/2010 | Voss et al. |
| 2015/0151675 A1 | 6/2015 | Lefevre et al. |
| 2015/0165965 A1 | 6/2015 | Masaki et al. |
| 2016/0002100 A1 | 1/2016 | Melcher et al. |

FOREIGN PATENT DOCUMENTS

| | | |
|---|---|---|
| WO | WO 2006/043026 A1 | 4/2006 |
| WO | WO 2008/155516 A1 | 12/2008 |
| WO | WO 2009/029466 A1 | 3/2009 |
| WO | WO 2013/104439 A1 | 7/2013 |
| WO | WO 2013/127563 A1 | 9/2013 |
| WO | WO 2013/131667 A1 | 9/2013 |

COMPOSITE PANE HAVING SUN PROTECTION COATING AND THERMAL-RADIATION-REFLECTING COATING

CROSS-REFERENCE TO RELATED APPLICATIONS

This application is the U.S. National Stage of PCT/EP2018/078077, filed Oct. 15, 2018, which in turn claims priority to European patent application number 17 205 439.7 filed Dec. 5, 2017. The content of these applications are incorporated herein by reference in their entireties.

The invention relates to a composite pane having sun protection coating and thermal-radiation-reflecting coating and to use thereof.

A composite pane that has the features of the generic part of claim 1 is known, for example, from DE 19927683 C1.

DE 19927683 C1 discloses a composite glass pane consisting of at least two glass panes and having a transparent composite layer joining them and having a sun protection layer substantially reflecting rays outside the visible spectrum of solar radiation, in particular infrared rays, characterized in that the composite glass pane is provided, on its surface facing an interior space, with a further transparent coating (low-E layer) substantially reflecting thermal radiation spatially separated from the sun protection layer. The object of DE 19927683 C1 is to provide a composite glass pane with sun protection properties, with which, at low outside temperatures, heat absorption out of the vehicle interior by a large area glazing is greatly reduced. The light transmittance through the composite pane is, for example, 31%.

Glazings such as those used in sunroofs and sliding roofs require light transmittance between 2 and 10% and specific sun protection, characterized by the TTS value, which is a measure of the total thermal radiation from the sun transmitted through the pane, and is measured, for example, according to ISO 9050. With higher light transmittance, for one thing, too much thermal radiation is transmitted and, for another, individuals behind the glazing can be visually disturbed by too much light. With lower light transmittance, the glazing is, on the whole, too dark, such that individuals behind the glazing can no longer see through it.

The objective is, consequently, the lowest possible TTS value in combination with light transmittance of 2 to 10% in order to ensure the best possible compromise between vision outside through the roof and good thermal properties. Therefore, low radiance and IR-reflecting, i.e., solar radiation controlling, functions must be combined in laminated sunroofs and sliding roofs. IR-reflecting, i.e., solar radiation controlling, functions are achieved by silver-based coatings on the inside of the outer pane or by a polyethylene terephthalate film between two polyvinyl butyral films. Silver-based coatings have the intrinsic disadvantage that reflectance in the visible range of light is relatively high at at least 10%. This reflectance influences the reflectance that is perceived on the interior-side of the glazing. Light reflectances of less than 6%, preferably of less than 4%, are not perceived as disturbing by vehicle occupants. Even the use of dark tinted polyvinyl butyral films between the sun-controlling coating and the inner pane cannot fully compensate this influence, and, depending on the der light transmittance, can increase the light reflectance of the interior-side of the inner pane. This increase in light reflectance is perceived as a disadvantage by vehicle occupants, in particular those in the rear seats, because visibility through the sunroof or sliding roof is degraded and optical discomfort occurs, e.g., as a result of strong reflection of the dashboard in the sunroof or the sliding roof.

These disadvantages also affect composite glass panes in sunroofs and sliding roofs as disclosed in DE 19927683 C1.

WO2013/127563A1 discloses another composite pane having a sun protection layer between the glass panes and a low-E coating on the interior-side surface. The low-E coating is based on niobium, tantalum, molybdenum, or zirconium.

The object of the invention is to achieve a constant light reflectance of less than 6%, preferably less than 4%, perceived on the interior side of the inner pane, over the required range of preferred light transmittance through the composite pane of 2 to 10%. A further object is to achieve the lowest TTS value possible.

This object is accomplished according to the invention by a composite pane according to claim 1. The composite pane according to the invention comprises an outer pane having an outer-side surface and an interior-side surface, an inner pane having an outer-side surface and an interior-side surface, and a thermoplastic intermediate layer that joins the interior-side surface of the outer pane to the outer-side surface of the inner pane, wherein the composite pane has, between the outer pane and the inner pane, at least one sun protection coating, that substantially reflects or absorbs rays outside the visible spectrum of solar radiation, in particular infrared rays, and wherein the composite glass pane has, on the interior-side surface of the inner pane, a thermal-radiation-reflecting coating, wherein the composite pane has a transmittance index A of 0.02 to 0.08, wherein the transmittance index A (A value) is determined according to the following formula (I)

$$A = TL_{composite\ glass\ pane}/(TL_{low-E-coated\ pane} * TE) \quad (I),$$

where TL is the light transmittance, and TE is the energy transmittance, measured in each case according to ISO 9050. "$TL_{composite\ glass\ pane}$" refers to the light transmittance through the entire composite pane. "$TL_{low-E-coated\ pane}$" refers to the light transmittance through the inner pane together with the thermal-radiation-reflecting coating. The TL values can be suitably adjusted through the selection of the tinting of the components of the composite pane, i.e., the inner pane, the outer pane, and the intermediate layer. The TE value is likewise determined through the selection of the tinting of the components of the composite pane and also through the properties of the sun protection coating and the thermal-radiation-reflecting coating. The corresponding values can be suitably selected by the person skilled in the art to achieve a transmittance index A according to the invention.

In principle, the transmittance values can also be determined by standards other than ISO 9050, with the transmittance index A changing only slightly.

Surprisingly, it has been found that such a composite pane has a low light transmittance of 1 to 12%, preferably of 2 to 10%, and, at the same time, a low total transmitted thermal radiation (TTS) of, in particular, less than 50%, preferably less than 35%, particularly preferably less than 25% (measured according to ISO 9050), with the light reflectance of the composite glass pane being less than 6%, in particular less than 4%.

Here, the light reflectance refers to the reflectance at angles of 8°.

Thus, only a small part of the incident solar radiation reaches the space behind the pane such that, on the one hand, advantageous sun protection is ensured and, on the other, heating of the space behind the composite pane is largely prevented, while, at the same time, the reflection on the inside of the inner pane can be reduced to a minimum.

The values for light transmittance (TL) and reflectance (RL) refer (as usual for automotive glazings) to light type A, i.e., the visible portion of sunlight at a wavelength of 380 nm to 780 nm. Rays that are substantially rays of the visible spectrum of solar radiation, in particular infrared rays, are rays of a wavelength greater than about 800 nm.

The transmittance index A is 0.02 to 0.08, preferably 0.04 to 0.08, particularly preferably 0.06 to 0.08, and most particularly preferably 0.07 to 0.08.

The composite pane is intended, in a window opening, to separate an interior space, in particular the interior of a vehicle from the external environment. The composite pane is a laminate and comprises a first and a second glass that are referred to in the context of the invention as "outer pane" and "inner pane" and are joined to one another via a thermoplastic intermediate layer. In the context of the invention "inner pane" is the pane that faces the interior in the installed position. "Outer pane" refers to the pane facing the external environment in the installed position. "Interior-side surface (or inside or inner surface)" means, in the context of the invention, that surface of the panes that faces the interior in the installed position. "Outer-side surface (outside or outer surface)" means, in the context of the invention, that surface of the panes that faces the external environment in the installed position.

The surfaces of the glass panes are typically referenced as follows:

The outer side of the outer pane is referred to as side 1. The inner-side of the outer pane is referred to as side 2. The outer side of the inner pane is referred to as side 3. The inner-side of the inner pane is referred to as side 4.

The interior-side surface of the outer pane and the outer-side surface of the inner pane face one another and are bonded to one another by means of the thermoplastic intermediate layer.

The thermoplastic intermediate layer is formed by one or a plurality of thermoplastic films. The thermoplastic films preferably contain polyvinyl butyral (PVB), ethylene vinyl acetate (EVA), polyurethane (PU) and/or mixtures thereof and/or copolymers thereof, particularly preferably polyvinyl butyral. The films are preferably based on the materials mentioned but can, however, contain other components, for example, plasticizers, colorants, IR or UV absorbers, preferably with a content of less than 50%.

It is preferred for the at least one thermoplastic polymer film, in particular the at least one PVB film, to be a tinted thermoplastic polymer film, in particular a tinted PVB film, with a light transmittance of 2 to 80%, preferably of 5 to 50%, and particularly preferably of 8 to 36%. The use of a tinted thermoplastic polymer film has the advantage that the light transmittance, relative to the entire laminated glass, can advantageously be adjusted by the selection of the thermoplastic polymer film. In addition, by combining thermoplastic polymer films with specific light transmittance and specific low-E layers, the reflectance at side 4 of the composite glass pane can be adjusted to the preferred range of less than 6%.

The individual polymer films, in particular the PVB films, preferably have a thickness of about 0.2 mm to 1 mm, for example, 0.38 mm or 0.76 mm. Other properties of the composite glass pane can be influenced by the thickness of the films. For example, thicker PVB films provide improved sound damping, in particular when they contain an acoustically active core, increased break-in resistance of the composite glass pane, and also increased protection against ultraviolet radiation (UV protection).

According to the invention, the sun protection coating (or sun protection layer) is arranged between the outer pane and the inner pane. In a preferred embodiment, the sun protection coating is applied on the interior-side surface of the outer pane. In another preferred embodiment, the sun protection coating is embedded in the thermoplastic intermediate layer. For this purpose, the sun protection coating is applied to a carrier film that is arranged between two thermoplastic films. The carrier film preferably contains polyethylene terephthalate (PET) and has a thickness of 20 µm to 100 µm, for example, approx. 50 µm. In another embodiment, the sun protection coating is applied to the outer-side surface of the inner pane.

The role of the sun protection coating is to filter out portions of solar radiation, in particular, in the infrared range. The sun protection coating preferably includes at least one thin transparent metallic layer embedded between at least one dielectric layer each. Silver has established itself as a preferred metal for the metallic layer since it has both a relatively neutral color effect and selectively reflects infrared radiation outside the visible range of solar radiation. The dielectric layers have the role, due to their refractive indices, of improving the optical properties of the coated pane and protecting the metallic functional layer against oxidation. Such sun protection layers, which can be produced, for example, using the reactive sputtering method, are widely used in glazings for buildings, but are also already used in motor vehicles. In most cases, layer systems with two silver functional layers, but even with three or four silver functional layers are used since their efficiency, i.e., the reflection of infrared radiation outside the visible range relative to transmittance of visible radiation, is greater.

Suitable sun protection coatings are known, for example, from WO2013/104439A1 as well as from DE 19927683C1.

The dielectric layers are preferably based on dielectric oxides or nitrides, such as ZnO, SnZnO, AlN, $SiO_2$, $TiO_2$, or $Si_3N_4$.

As an alternative to the inorganic, in particular silver-based coatings, the sun protection coating can also be formed on a nonmetallic, organic basis. The sun protection coating is, in this case, preferably a stack of several, typically several hundred organic layers with different or alternating refractive indices. The stack is a birefringent dielectric interference stack that reflects IR radiation due to interference effects. Compared to metallic coatings, such organic coatings have the advantage of higher color neutrality and higher light transmittance. Moreover, they do not interfere with the transmission of electromagnetic signals. Such sun protection coatings on PET carrier films are provided, for example, by the company 3M under the tradename "Ultra-CLear Solar Film".

According to the invention, a coating reflecting thermal radiation is applied on the interior-side of the inner pane (side 4). Such coatings are known, for example, from WO2013/131667A1. The thermal-radiation-reflecting coating can also be referred to as a coating with low emissivity, an emissivity-reducing coating, low-E coating, or low-E layer. Its role is to reflect thermal radiation, i.e., in particular, IR radiation of longer wavelength than the IR component of solar radiation. At low outside temperatures, the low-E coating reflects heat back into the interior and reduces the cooling of the interior. At high outside temperatures, the low-E coating reflects the thermal radiation of the heated composite pane outward and reduces the heating of the interior. On the interior side of the inner pane, the coating according to the invention reduces the emission of thermal radiation from the pane into the interior particularly effectively in the summer and reduces the emission of heat into the external environment in the winter.

The thermal-radiation-reflecting coating preferably includes a functional layer that contains a transparent conductive oxide (TCO), preferably indium tin oxide, antimony-doped or fluorine-doped tin oxide and/or gallium-and/or aluminum-doped zinc oxide (ZnO:Ga, bzw. ZnO:Al), with indium tin oxide referred. The functional layer can, however, also contain other electrically conductive oxides, for example, fluorine-doped tin oxide ($SnO_2$:F), antimony-doped tin oxide ($SnO_2$:Sb), mixed indium zinc oxide (IZO), gallium-doped or aluminum-doped zinc oxide, niobium-doped titanium oxide, cadmium stannate, and/or zinc stannate. Good results in terms of emissivity and bendability of the coating according to the invention are thus achieved. The refractive index of the material of the functional layer is preferably 1.7 to 2.5.

The indium tin oxide is preferably deposited by means of magnetron-enhanced cathodic sputtering with a target of indium tin oxide. The target preferably contains from 75 wt.-% to 95 wt.-% indium oxide and from 5 wt.-% to 25 wt.-% tin oxide as well as production-related admixtures. The deposition of the tin-doped indium oxide is preferably done under a protective gas atmosphere, for example, argon. A small amount of oxygen can also be added to the protective gas, for example, to improve the homogeneity of the functional layer.

Alternatively, the target can preferably contain at least from 75 wt.-% to 95 wt.-% indium and from 5 wt.-% to 25 wt.-% tin. The deposition of the indium tin oxide is preferably done under addition of oxygen as the reaction gas during cathodic sputtering.

The thermal-radiation-reflecting coating also typically includes dielectric layers, in particular made of dielectric oxides or nitrides, such as ZnO, SnZnO, AlN, $TiO_2$, $SiO_2$, or $Si_3N_4$. The layer of a reflecting conductive oxide is made antireflective by using additional dielectric layers above and below to ensure sufficiently low reflection from the interior side.

The emissivity of the pane according to the invention can be influenced by the thickness of the functional layer of the thermal-radiation-reflecting coating. The thickness of the functional layer is preferably 40 nm to 200 nm, particularly preferably 60 nm to 150 nm, and most particularly preferably 65 nm to 85 nm, for example, about 75 nm. In this range for the thickness, particularly advantageous values for the emissivity and a particularly advantageous ability of the thermal-radiation-reflecting coating to withstand mechanical transformation such as bending or tempering without damage are obtained.

The interior-side emissivity of the composite pane according to the invention is preferably less than or equal to 50%, particularly preferably from 10% to 50%, most particularly preferably from 20% to 35%. "Interior-side emissivity" refers to the measure indicating how much thermal radiation the pane emits in the installed position compared to an ideal heat radiator (a black body) into an interior, for example, of a building or of a vehicle. In the context of the invention, "emissivity" means the normal emissivity at 283 K according to the standard EN 12898.

The composite pane according to the invention is also preferably characterized in that the inner pane together with the thermal-radiation-reflecting coating (low-E layer) applied thereto has light transmittance of 25% to 95%.

Independently of one another, the outer pane and the inner pane are preferably made of glass or plastic, preferably soda lime glass, alkali aluminosilicate glass, polycarbonate, or poly methacrylate. In a particularly preferred embodiment, the outer pane and the inner pane are made of glass.

Suitable glass panes include glass panes that are known under the tradenames VG10, VG20, VG40 or TSANx, TSA3+, TSA4+ from Saint-Gobain, with the glasses from the VG series gray-colored glasses and those of the TSA series green-colored glasses.

Independently of one another, the outer and/or the inner pane preferably has a thickness of 0.1 to 4 mm, preferably of 1 to 4 mm, particularly preferably of 1.6 mm to about 2.1 mm.

The composite pane according to the invention preferably has light transmittance of 1% to 12%, preferably of 2% to 10% (measured according to ISO 9050).

The inner pane with the thermal-radiation-reflecting coating (low-E layer) applied thereto preferably has light reflectance (RL) of less than 6% at an angle of 8°, particularly preferably of less than 4.0% (measured according to ISO 9050). This means the light reflectance of the coated inner pane as part of the composite pane—in other words, the interior-side reflectance of the composite pane, i.e., the light reflectance at the surface of the inner pane facing away from the outer pane.

The transmittance index A is ideally set as a function of the light transmittance of the intermediate layer in order to achieve optimum properties. Preferably, the transmittance index A is in the range of 0.02 to 0.08 with light transmittance (TL) of the intermediate layer of 5 to 20%, in the range of 0.04 to 0.08 with light transmittance of the intermediate layer of 20 to 25%, in the range of 0.05 to 0.08 with light transmittance of the intermediate layer of 25 to 30%, and in a range of 0.07 to 0.08 with light transmittance of the intermediate layer greater than 30%, preferably of 30% to 50%.

Preferably, the above-mentioned ranges for the light transmittance of the intermediate layer are conclusive, i.e., the intermediate layer has light transmittance of 5 to 50%, with the transmittance index A exhibiting the above-described dependence on the light transmittance of the intermediate layer.

In a particularly advantageous embodiment, the composite pane has a transmittance index of 0.07 to 0.08, with the light transmittance of the intermediate layer being from 8% to 36%. This yields particularly good results.

In an advantageous further development of the invention, a functional element with electrically controllable optical properties is embedded in the thermoplastic intermediate layer. This enables visibility through the composite pane to be controlled electrically, in particular between a clear transparent state and a state of reduced transmittance. The values indicated for the light transmittance of the composite pane or of the intermediate layer always refer to the composite pane with the functional element in the clear, transparent state.

Such functional elements are typically used in combination with sun protection coatings to protect the functional element against damaging IR radiation. The composite pane according to the invention with the reduced interior-side reflection displays its advantages especially in combination with an electrically controllable functional element: the unwanted interior-side reflection would be perceived as disturbing in particular when the pane has been switched to the transparent state since it is precisely in this state that an unobstructed view to the outside is desired.

The functional element is arranged between at least two layers of thermoplastic material of the intermediate layer, in particular between two polymer films, wherein it is connected by the first layer to the outer pane and by the second layer to the inner pane. Preferably, the side edge of the functional element is completely surrounded by the intermediate layer such that the functional element does not extend to the side edge of the composite pane and thus has no contact with the surrounding atmosphere. In order to compensate for the thickness of the functional element in the edge region, the functional element can be inserted in a recess of a third layer of thermoplastic material.

The functional element includes at least one active layer that is arranged between a first carrier film and a second carrier film. The active layer has the variable optical properties that can be controlled by an electrical voltage applied to the active layer. In the context of the invention, "electrically controllable optical properties" means those properties that are infinitely controllable but also those that can be switched between two or more discrete states. Said optical properties relate, in particular, to light transmittance and/or scattering behavior. The functional element also includes surface electrodes for applying the voltage to the active layer, which are preferably arranged between the carrier films and the active layer.

In a preferred embodiment, the functional element is a PDLC functional element (polymer dispersed liquid crystal). The active layer of a PDLC functional element contains liquid crystals that are embedded in a polymer matrix. When no voltage is applied on the surface electrodes, the liquid crystals are oriented in a disorderly fashion, resulting in strong scattering of the light passing through the active layer. When a voltage is applied on the surface electrodes, the liquid crystals align themselves in a common direction and the transmittance of light through the active layer is increased.

In another preferred embodiment, the functional element is an SPD functional element (suspended particle device). The active layer contains suspended particles, wherein the absorption of light by the active layer can be changed by applying a voltage on the surface electrodes. In principle, however, it is also possible to use other types of controllable functional elements, for example, electrochromic functional elements. The controllable functional elements mentioned and their mode of operation are known per se to the person skilled in the art such that a detailed description can be dispensed with here.

The surface electrodes are preferably designed as transparent, electrically conductive layers. The surface electrodes preferably contain at least a metal, a metal alloy, or a transparent conductive oxide (TCO). The surface electrodes can contain, for example, silver, gold, copper, nickel, chromium, tungsten, indium tin oxide (ITO), gallium-doped or aluminum-doped zinc oxide, and/or fluorine-doped or antimony-doped tin oxide. The surface electrodes preferably have a thickness of 10 nm to 2 µm, particularly preferably of 20 nm to 1 µm, most particularly preferably of 30 nm to 500 nm.

The functional element is in particular present as a multilayer film with two outer carrier films. In such a multilayer film, the surface electrodes and the active layer are typically arranged between the two carrier films. Here, "outer carrier film" means that the carrier films form the two surfaces of the multilayer film. The functional element can thus be provided as a laminated film that can be processed advantageously. The functional element is advantageously protected by the carrier films against damage, in particular corrosion. The multilayer film contains, in the order indicated, at least one carrier film, one surface electrode, one active layer, another surface electrode, and another carrier film. Typically, the carrier films have in each case an electrically conductive coating that faces the active layer and functions as a surface electrode. The carrier films typically contain PET and have a thickness of 0.1 mm to 1 mm, in particular of 0.1 mm to 0.2 mm.

The present invention also relates to the use of the composite pane according to the invention in a vehicle, preferably as a roof panel of a vehicle, particularly preferably as a roof panel of a motor vehicle, in particular a passenger car.

The present invention further relates to a vehicle, preferably a motor vehicle including the composite glass pane according to the invention.

In the following, the invention is explained in detail with reference to drawings and exemplary embodiments. The drawings are schematic representations and not to scale. The drawings in no way restrict the invention.

Figure 2:
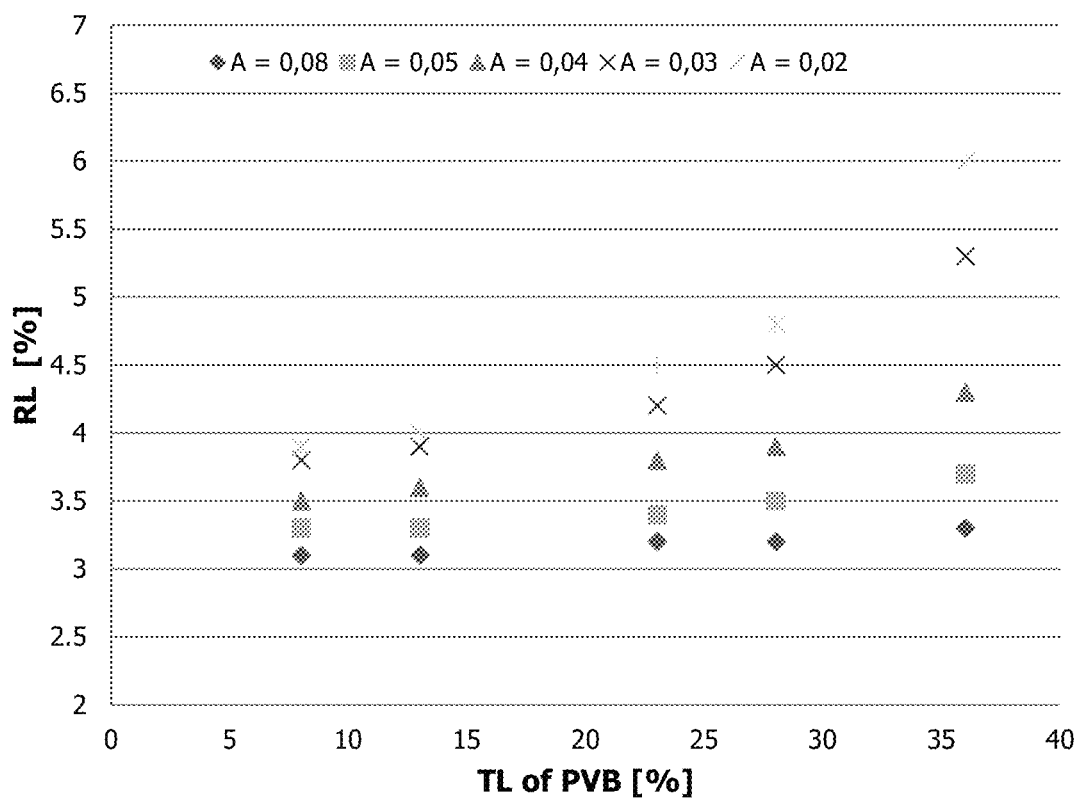

They depict:

FIG. 1 a cross-section through an embodiment of the composite pane according to the invention, FIG. 2 a diagram of the reflectance of an embodiment of the composite pane according to the invention as a function of the light transmittance of the intermediate layer.

FIG. 1 depicts a cross-section through an embodiment of the composite pane according to the invention. The composite pane comprises an outer pane 1 and an inner pane 2 that are joined to one another via a thermoplastic intermediate layer 3. The composite pane has a size of approx. 1 m$^2$ and is intended for use as a roof panel of a passenger car, with the outer pane 1 intended to face the external environment and the inner pane 2 intended to face the vehicle interior. The outer pane 1 has an outer-side surface I and an interior-side surface II. The inner pane 2 has an outer-side surface III and an interior-side surface IV. The outer-side surface I and III face the external environment in the installed state; the interior-side surfaces II and IV face the vehicle interior in the installed position. The interior-side surface II of the outer pane 1 and the outer-side surface III of the inner pane 2 face one another. The outer pane 1 and the inner pane 2 contain soda lime glass and have in each case a thickness of 2.1 mm. The thermoplastic intermediate layer 3 contains or is made of polyvinyl butyral (PVB) and has a thickness of 0.76 mm.

A sun protection coating 4 is arranged on the interior-side surface II of the outer pane 1. The sun protection coating 4 extends over the entire surface II minus a circumferential frame-shaped coating-free region with a width of 8 mm. The coating-free region is hermetically sealed by bonding with the thermoplastic intermediate layer 3. The sun protection coating 4 is thus advantageously protected against damage and corrosion. The sun protection coating 4 comprises, for example, at least two functional layers that at least contain silver or are made of silver and have a layer thickness between 10 nm and 20 nm, with each functional layer arranged between two dielectric layers made of silicon nitride with a thickness of 40 nm to 70 nm.

A thermal-radiation-reflecting coating 5 is arranged on the interior-side surface IV of the inner pane 2. The coating 5 comprises a functional ITO layer with a thickness of 60 nm to 150 nm. The coating 5 further comprises additional dielectric layers above and below the functional layer made, in particular, of Al-doped $SiO_2$ and $Si_3N_4$.

The sun protection coating 4 results in reduced heating of the vehicle interior and of the inner pane 2 due to the reflection of infrared radiation. On the one hand, the thermal-radiation-reflecting coating 5 reduces the radiation of thermal radiation by the composite pane into the vehicle interior, in particular with high outside temperatures. On the other hand, thermal-radiation-reflecting coating 5 reduces the radiation of thermal radiation out of the vehicle interior with low outside temperatures.

FIG. 2 shows the light reflectance of the reflecting coating (low-E layer) of certain composite glass panes with different values for the transmittance index A as a function of the light transmittance of the intermediate layer 3 made of PVB. The diagram is discussed in connection with the example.

In the following, the invention is explained in detail using a nonrestrictive exemplary embodiment with reference to the accompanying figures.

EXAMPLE

TABLE 1

|   | TL [%] IRR glass | TL [%] PVB | TL [%] Low-E glass | TL [%] Product | RL [%] Side 4 | A |
|---|---|---|---|---|---|---|
| a) | 76 | 36 | 27.2[a] | 9.9 | 3.3 | 0.08 |
|   | 76 | 8 | 27[a] | 2.2 | 3.1 | 0.08 |
| b) | 76 | 28 | 39.5[b] | 11 | 3.5 | 0.05 |
|   | 76 | 8 | 39.5[b] | 3.2 | 3.3 | 0.05 |
| c) | 76 | 23 | 54.5[c] | 12 | 3.8 | 0.04 |
|   | 76 | 8 | 54.5[c] | 4.4 | 3.5 | 0.04 |
| d) | 76 | 13 | 76.9[d] | 10 | 3.9 | 0.03 |
|   | 76 | 8 | 76.9[d] | 6.3 | 3.8 | 0.03 |
| e) | 76 | 8 | 91.3[e] | 7.4 | 3.9 | 0.02 |
|   | 76 | 8 | 91.3[e] | 7.4 | 3.9 | 0.02 |

Legend:
IRR glass: outer pane 1 having sun protection coating 4
PLC 2.1 mm glass pane (Saint-Gobain) having sun protection coating 4, including three functional silver layers
PVB: intermediate layer 3 tinted PVB film with different TL
Low-E glass: inner pane 2 having thermal-radiation-reflecting coating 5 glass panes (Saint-Gobain) with different light transmittance, in each case with thermal-radiation-reflecting coating 5, including a functional ITO layer
a) VG10 glass, 2.1 mm
b) VG20 glass, 2.1 mm
c) VG 40 glass, 2.1 mm
d) TSA4+ glass, 2.1 mm
e) PLC glass, 2.1 mm
Product: Complete composite pane
RL side 4: Reflectance, as defined above
A: Transmittance Index, as defined above It can be seen that the advantageous reflectance of less than 6%, preferably of less than 4% can be achieved with the combinations listed in Table 1. In addition, it can be seen that with high transmittance indices of 0.05 to 0.08, high variability of transmittances of the PVB films used is possible without significantly impacting the RL on the side 4. The smaller the transmittance index, the lower the variability in the transmittance of the PVB used, without the RL on side 4 departing from the preferred range.

This can also be seen in FIG. 2.

A composite pane with dark VG10 2.1 mm glass has a transmittance index A of 0.08 (diamond-shaped symbol in FIG. 2). A composite pane with lighter PLC 2.1 mm glass has a transmittance index A of 0.02 (three-lined X symbol in FIG. 2).

FIG. 2 shows that with increasing light transmittance of the intermediate layer 3, the light reflectance of the reflecting coating (low-E layer) of all composite glass panes with the different values for the transmittance index A increases. For composite glass panes with a high transmittance index A, e.g., 0.08, the increase in the light reflectance of the reflecting coating (low-E layer) rises more slowly with increasing light transmittance of the intermediate layer 3 than for those with a low transmittance index A, e.g., 0.02.

COMPARATIVE EXAMPLE

TABLE 2

|   | TL [%] IRR-glass | TL [%] PVB | TL [%] Low-E glass | TL [%] Product | RL [%] Side 4 | A |
|---|---|---|---|---|---|---|
| a) | 76 | 36 | 10 | 3.5 | 3.1 | 0.22 |

The Comparative Example differs from the Example a, variant with 36% TL of the intermediate layer only in that the thickness of the inner pane made of VG10-glass was 3.9 mm instead of 2.1 mm. It can be seen that the transmittance index A here is clearly outside the targeted range. A similar result can be expected if the degree of tinting of the inner pane were increased instead of its thickness.

LIST OF REFERENCE CHARACTERS (1) outer pane
(2) inner pane
(3) thermoplastic intermediate layer
(4) sun protection coating
(5) thermal-radiation-reflecting coating/low-E coating
(I) outer-side surface (outer surface) of (1)
(II) interior-side surface (inner surface) of (1)
(III) outer-side surface (outer surface) of (2)
(IV) interior-side surface (inner surface) of (2)

The invention claimed is:

1. A composite pane, comprising an outer pane having an outer-side surface and an interior-side surface, an inner pane having an outer-side surface and an interior-side surface, and a thermoplastic intermediate layer, which joins the interior-side surface of the outer pane to the outer-side surface of the inner pane,
   wherein the composite pane has, between the outer pane and the inner pane, at least one sun protection coating, which substantially reflects or absorbs rays outside the visible spectrum of solar radiation, and
   wherein the composite pane has, on the interior-side surface of the inner pane, a thermal-radiation-reflecting coating (low-E coating),
   wherein
      the thermal-radiation-reflecting coating contains a transparent conductive oxide,
      the composite pane has light transmittance $TL_{composite\ glass\ pane}$ of 1% to 12%, and
      the composite pane has a transmittance index A of 0.02 to 0.08, wherein the transmittance index A is determined according to the following formula (I)

$$A = TL_{composite\ glass\ pane} / (TL_{low\text{-}E\text{-}coated\ pane} * TE) \quad (I),$$

where TL is the light transmittance and TE is the energy transmittance measured according to ISO 9050.

2. The composite pane according to claim 1, wherein light reflectance at the interior-side surface of the inner pane at an angle of 8° is less than 6%.

3. The composite pane according to claim 1, wherein the sun protection coating comprises a layer system with at least one metal layer embedded between dielectric oxide or nitride layers.

4. The composite pane according to claim 1, wherein the sun protection coating is applied directly to the interior-side surface of the outer pane.

5. The composite pane according to claim 1, wherein the sun protection coating is arranged on a carrier film embedded in the intermediate layer.

6. The composite pane according to claim 1, wherein the intermediate layer is formed from at least one polymer film.

7. The composite pane according to claim 6, wherein the at least one polymer film has light transmittance of 2% to 80%.

8. The composite pane according to claim 1, wherein the thermal-radiation-reflecting coating contains indium tin oxide, antimony-doped or fluorine-doped tin oxide and/or aluminum-doped zinc oxide (ZnO:Al) and/or gallium-doped zinc oxide (ZnO:Ga).

9. The composite pane according to claim 1, wherein the inner pane together with the thermal-radiation-reflecting coating applied thereto has light transmittance $TL_{low\text{-}E\text{-}coated\ pane}$ of 25% to 95%.

10. The composite pane according to claim 1, which has light transmittance $TL_{composite\ glass\ pane}$ of 2% to 10%.

11. The composite pane according to claim 1, wherein the inner pane with the thermal-radiation-reflecting coating applied thereto has light reflectance at an angle of 8° of less than 6%.

12. The composite pane according to claim 1, wherein the transmittance index A
with light transmittance of the intermediate layer of 5 to 20%,
with light transmittance of the intermediate layer of 20 to 25%,
with light transmittance of the intermediate layer of 25 to 30%, and
with light transmittance of the intermediate layer of more than 30% is in a range from 0.07 to 0.08.

13. The composite pane according to claim 1, wherein the outer pane and/or the inner pane have a thickness of 0.5 mm to 4 mm.

14. The composite pane according to claim 1, wherein a functional element with electrically controllable optical properties is embedded in the intermediate layer.

15. A method comprising utilizing composite pane according to claim 1 as a roof panel of a vehicle.

16. The composite pane according to claim 1, wherein the at least one sun protection coating substantially reflects or absorbs infrared rays.

17. The composite pane according to claim 3, wherein the at least one metal layer embedded between dielectric oxide or nitride layers is at least one metallic silver layer.

18. The composite pane according to claim 6, wherein the at least one polymer film contains polyvinyl butyral, ethylene vinyl acetate, polyurethane, and/or mixtures thereof and/or copolymers thereof.

19. The composite pane according to claim 7, wherein the at least one polymer film has light transmittance of 8% to 36%.

20. The composite pane according to claim 14, wherein the functional element with electrically controllable optical properties is a PDLC element or an SPD element.

\* \* \* \* \*